US012412020B2

(12) United States Patent
Veraa et al.

(10) Patent No.: US 12,412,020 B2
(45) Date of Patent: Sep. 9, 2025

(54) EFFECTIVE METAL DENSITY SCREENS FOR HIERARCHICAL DESIGN RULE CHECKING (DRC) ANALYSIS

(71) Applicant: International Business Machines Corporation, Armonk, NY (US)

(72) Inventors: Brian Veraa, Round Rock, TX (US); Ryan Michael Kruse, Williamson, TX (US); Christopher Gonzalez, Shelburne, VT (US); David Wolpert, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 702 days.

(21) Appl. No.: 17/666,635

(22) Filed: Feb. 8, 2022

(65) Prior Publication Data

US 2023/0252218 A1 Aug. 10, 2023

(51) Int. Cl.
*G06F 30/398* (2020.01)

(52) U.S. Cl.
CPC .................. *G06F 30/398* (2020.01)

(58) Field of Classification Search
CPC .................................... G06F 30/398
USPC ....................................... 716/111
See application file for complete search history.

(56) References Cited

U.S. PATENT DOCUMENTS

| 6,487,706 | B1 | 11/2002 | Barkley et al. |
| 7,353,490 | B2 | 4/2008 | Jiang et al. |
| 8,656,332 | B2 | 2/2014 | Fleischer et al. |
| 10,089,433 | B2 | 10/2018 | Hsu et al. |
| 10,372,866 | B2 | 8/2019 | Berry et al. |
| 10,685,164 | B1 | 6/2020 | Ding et al. |
| 11,836,435 | B1 * | 12/2023 | Kang ..................... G06F 30/394 |
| 2007/0264731 | A1 * | 11/2007 | Jeng ............... G01R 31/318364 438/14 |

(Continued)

FOREIGN PATENT DOCUMENTS

CN 109558667 A 4/2019

OTHER PUBLICATIONS

Anonymous, "Innovative NWELL Isolation Methodology For Enabling Power Domain Independent Metal ECOs" IPCOM000218259D, May 30, 2012. 14 pages.

*Primary Examiner* — Jack Chiang
*Assistant Examiner* — Suchin Parihar
(74) *Attorney, Agent, or Firm* — CANTOR COLBURN LLP; Randy Emilio Tejeda (57) ABSTRACT

Aspects of the invention include systems and methods configured to provide hierarchical circuit designs that makes use of effective metal density screens during hierarchical design rule checking (DRC) analysis. A non-limiting example computer-implemented method includes providing a first hierarchical level of a chip design. The first hierarchical level includes one or more internal shapes and at least one blockage shape having an internal structure defined at a second hierarchical level of the chip design. A tuple is assigned to the blockage shape. The tuple includes a metal layer identifier for the blockage shape, a minimum expected density for the blockage shape, and a maximum expected density for the blockage shape. The method includes determining whether a density violation exists in the first hierarchical level based in part on one or both of the minimum expected density for the blockage shape and the maximum expected density for the blockage shape.

20 Claims, 7 Drawing Sheets

(56) References Cited

U.S. PATENT DOCUMENTS

| | | | |
|---|---|---|---|
| 2007/0266352 A1* | 11/2007 | Cheng | G06F 30/394 |
| | | | 716/112 |
| 2008/0120586 A1* | 5/2008 | Hoerold | G06F 30/39 |
| | | | 716/55 |
| 2008/0216038 A1* | 9/2008 | Bose | G06F 30/392 |
| | | | 716/118 |
| 2009/0210845 A1* | 8/2009 | Malgioglio | G06F 30/327 |
| | | | 716/119 |
| 2009/0254874 A1* | 10/2009 | Bose | G06F 30/39 |
| | | | 716/113 |
| 2016/0232272 A1* | 8/2016 | Liu | G06F 30/392 |
| 2017/0061063 A1* | 3/2017 | Gupta | G06F 30/392 |
| 2017/0286576 A1* | 10/2017 | Nieuwoudt | G06F 30/398 |
| 2019/0340326 A1* | 11/2019 | Huda | H01L 21/0274 |
| 2024/0411975 A1* | 12/2024 | Wolpert | G06F 30/39 |

* cited by examiner

EFFECTIVE METAL DENSITY SCREENS FOR HIERARCHICAL DESIGN RULE CHECKING (DRC) ANALYSIS

BACKGROUND

The present invention generally relates to circuit design. More specifically, the present invention relates to a hierarchical circuit design that makes use of effective metal density screens for hierarchical design rule checking (DRC) analysis.

Conventional integrated circuits (ICs) are created by patterning a wafer or substrate to form various devices and interconnections. The process for designing an IC begins generally by hierarchically defining functional components of the circuit using a hardware description language. From this high-level functional description, a physical circuit implementation dataset known as a netlist is created. In its simplest form, a netlist identifies logic cell instances from a cell library and consists of a list of the electronic components in a circuit and a list of the nodes they are connected to (i.e., cell-to-cell connectivity information).

A layout file is created using the netlist in a process known as placing and routing. The layout file assigns (i.e., places) logic cells to physical locations in the device layout and a software "router" or circuit designer routes their interconnections. In this manner, component devices and interconnections of the integrated circuit are constructed layer by layer. Once the layout file is generated, each layer is successively deposited onto the wafer and patterned using a photolithography process. These processes leverage one or more photomasks to transfer a layout pattern onto a physical layer on the wafer. Each photomask is created from the layout file of each wafer layer.

Deep sub-micron technologies have complicated metal density rules required for manufacturing reliability. These rules include minimum, maximum, and density gradient checks. Metal density rules can be applied to the entire chip, on a stepped window, or in certain special circumstances, such as directly under C4 bumps. To pass density rules, chip designs first implement the metal design, and then backfill empty spaces with metal fill shapes.

Hierarchical designs apply metal fill insertions at different levels of hierarchy based on metal ownership. Metal fill insertion is DRC aware, leading to good initial solutions. After DRC checking, any failing rules are typically addressed by further modifying the metal fill shapes. In some cases, however, adjusting the fill shapes is insufficient to resolve the errors and a change to the metal/routing design is required. A slow turnaround loop can potentially jeopardize tapeout schedules when errors are found in a parent level that requires changes to child hierarchies.

SUMMARY

Embodiments of the present invention are directed to hierarchical circuit designs that make use of effective metal density screens during hierarchical design rule checking (DRC) analysis. A non-limiting example method includes providing a first hierarchical level of a chip design. The first hierarchical level includes one or more internal shapes and at least one blockage shape having an internal structure defined at a second hierarchical level of the chip design. A tuple is assigned to the blockage shape. The tuple includes a metal layer identifier for the blockage shape, a minimum expected density for the blockage shape, and a maximum expected density for the blockage shape. The method includes determining whether a density violation exists in the first hierarchical level based in part on one or both of the minimum expected density for the blockage shape and the maximum expected density for the blockage shape. In this manner density violations can be found even prior to completing DRC for other hierarchical levels upon which the current level depends (e.g., parent levels or blackbox child levels).

In some embodiments of the invention, one or more of a size, a shape, and a position of an internal shape of the one or more internal shapes of the first hierarchical level are adjusted in response to determining that the density violation exists. In some embodiments of the invention, adjustments are made until the density violation is cured. In some embodiments of the invention, the adjustment(s) are made prior to completing a design rule check of the second hierarchical level.

In some embodiments of the invention, the first hierarchal level comprises a child level of the chip design and the second hierarchical level comprises a parent level of the child level. In some embodiments of the invention, the first hierarchal level comprises a first child level of the chip design and the second hierarchical level comprises a second child level of the chip design.

In some embodiments of the invention, the internal shapes comprise wire shapes and fill shapes. In some embodiments of the invention, the assigned values for the minimum expected density and the maximum expected density are defined by a DRC deck minimum density requirement and a maximum density requirement, respectively.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

The design of next-generation integrated circuits (ICs) (e.g., those having Very Large Scale Integration (VLSI) layouts) includes manufacturing layout verification, layout modifications, and verification of design conventions. Layout verification involves checking a proposed layout against design rules (DRC) and a comparison of extracted circuitry against a schematic netlist, often using electronic design automation (EDA) tools. To complete layout verification, a layout file is created using a netlist in a process known as placing and routing. The layout file assigns (i.e., places) logic cells to physical locations in the device layout and a software "router" or circuit designer routes their interconnections. Once the layout file is generated, each layer is successively deposited onto a wafer and patterned using a photolithography process.

IC feature geometries are continually being driven to smaller and smaller dimensions. For deep sub-micron manufacturing, such as below the 22 nm node, the layout geometries must satisfy increasingly complicated metal density rules to ensure manufacturing reliability. Initial checking is done for all hierarchical components of a layout/design. Current approaches typically use "Cell Level Checks" which have a more restrictive rule than signoff to avoid discovering density fails at the chip level. Signoff metal density checks are applied at the chip level.

Unfortunately, when checking a child block in a hierarchical design, the DRC run does not have context (i.e., parent and child data) to properly check density fails at the boundaries of the hierarchy. For example, regions of the block not owned by that particular level of hierarchy (taking the form of cutouts in the design hierarchical boundary) are seen as empty, as well as the perimeter around the outside of the design. These unowned regions may include placement objects in a given region, or may be defined on a per-metal layer basis for routing shapes regardless of the owner of placement objects in a given region. Blackboxed child hierarchies within the design are also seen as empty. These large empty regions can generate false fails for minimum density DRC checks. These false fails make it more difficult to determine whether a real density fail exists until the parent context DRC is run. Complicating matters further, high-density regions at both sides of a hierarchy boundary can result in real density fails seen at the parent that require updating the child, but that are not discoverable within the child level itself. Finding fails at the parent level that require changes to child hierarchies results in a slow turnaround loop at the end of the design process and can potentially jeopardize the tapeout schedule.

One or more embodiments of the present invention address one or more of the above-described shortcomings by providing effective cross-hierarchy metal density screens that simplify and improve hierarchical DRC analysis. Embodiments of the present invention provide a mechanism to define a non-manufacturable shape (also referred to as a blockage) that can be included in the hierarchical DRC checking run. This new blockage shape can be defined using a three-entry tuple (3-tuple) that represents an expected range of densities for the respective region. The tuple can include, for example: (1) the metal layer "Mx"; (2) the minimum expected density for Mx; and (3) the maximum expected density for Mx. The blockage shape can be added to regions that do not have a layout context for the hierarchical design, such as, for example, blackboxed children, parent-owned regions, and regions just outside block boundaries.

Advantageously, a hierarchical design configured according to one or more embodiments offers several technical solutions over conventional layout verification schemes. As an initial matter, leveraging effective metal density range predictions according to one or more embodiments enhances hierarchical DRC runs as the effective (or predicted) density ranges can help discover real or expected density fails within and near hierarchy boundaries of a child block prior to running checks on the parent hierarchy.

In some embodiments of the invention, the minimum expected density value for a blockage shape is used (assumed) when running DRC checks for minimum density. If a parent level at minimum predicted density does not resolve a minimum density fail within a child block, then the current level of hierarchy can take steps to increase metal density prior to running the parent block itself. In some embodiments of the invention, the maximum expected density value for a blockage shape is used (assumed) when running DRC checks for maximum density. If a parent level at maximum predicted density does not resolve a maximum density fail within a child block, then the current level of hierarchy can take steps to reduce metal density prior to running the parent block itself. In other embodiments, to provide looser requirements while examining density feasibility or to identify risk magnitudes, the minimum predicted density may be used to look for maximum density violations, or the maximum predicted density may be used to look for minimum density violations. In some embodiments of the invention, DRC checks that use these minimum/maximum density estimates can be clearly marked as "predictive density checking values" (or some other label) and be can prevented during DRC from being applied as signoff requirements.

Figure 1:
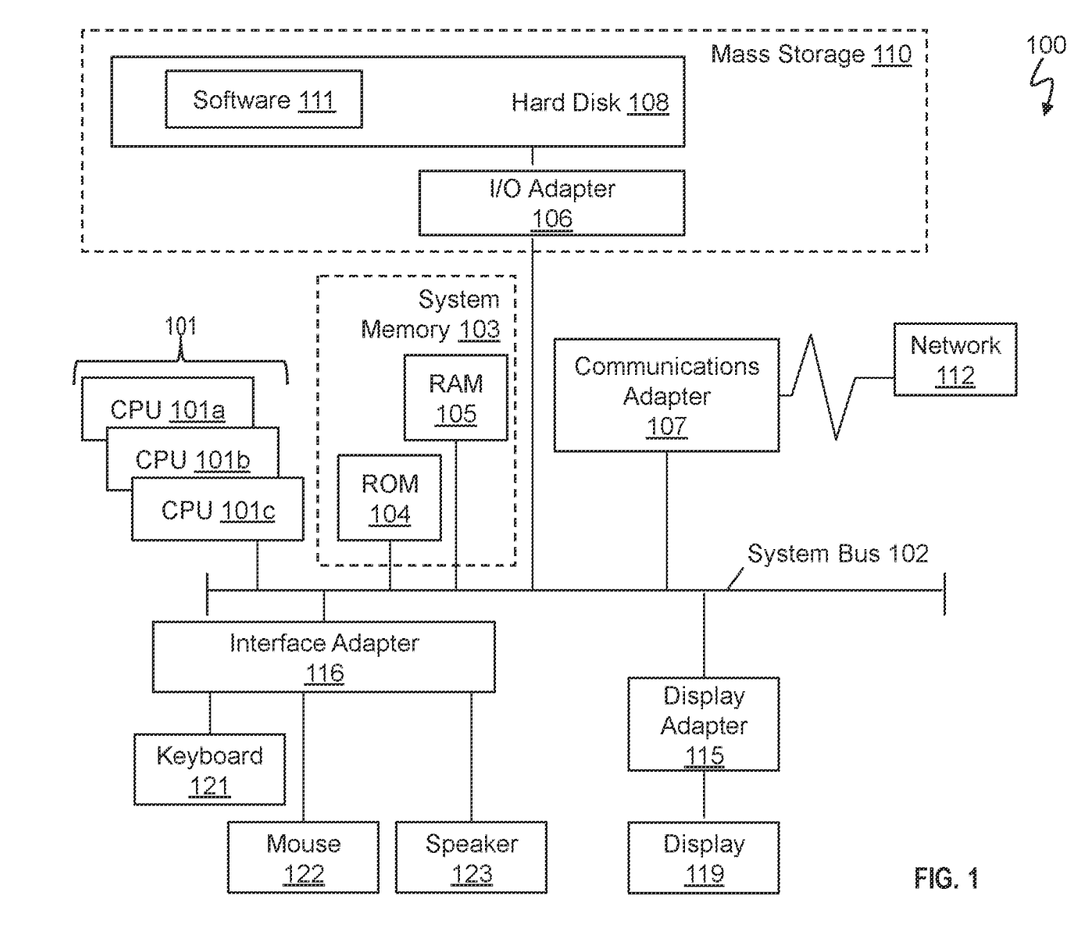
FIG. 1 depicts a block diagram of an example computer system for use in conjunction with one or more embodiments of the present invention.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node (e.g., a node 10 of FIG. 9 below). Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random-access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
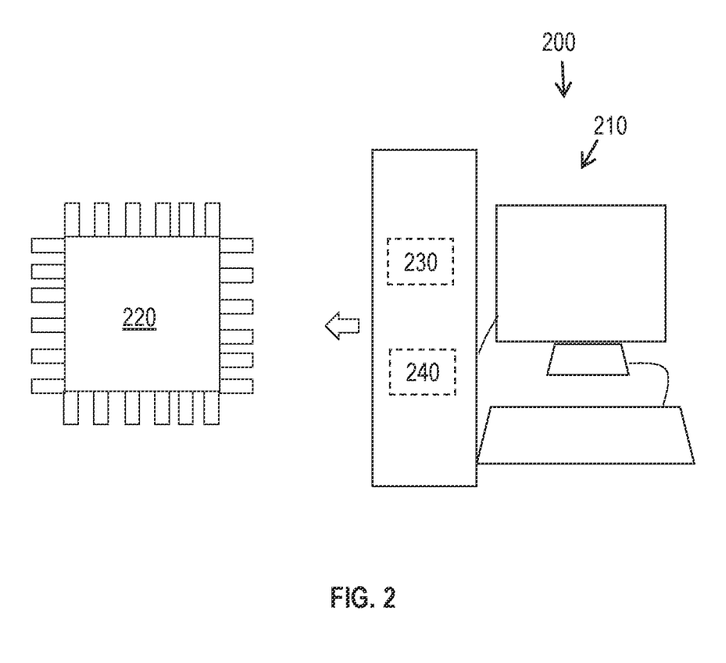
FIG. 2 is a block diagram of a system configured to perform effective metal density screens for hierarchical DRC analysis in accordance with one or more embodiments of the present invention.

FIG. 2 is a block diagram of a system 200 configured to perform effective metal density screens for hierarchical DRC analysis according to embodiments of the invention. The system 200 includes processing circuitry 210 used to generate the design that is ultimately fabricated into an integrated circuit 220. The steps involved in the fabrication of the integrated circuit 220 are well-known and briefly described herein. Once the physical layout is finalized, based, in part, on effective metal density screens leveraged according to embodiments of the invention to facilitate optimization of the placing and routing plan, the finalized physical layout is provided to a foundry. Masks are generated for each layer of the integrated circuit based on the finalized physical layout. Then, the wafer is processed in the sequence of the mask order. The processing includes photolithography and etch. This is further discussed with reference to FIG. 3.

Figure 3:
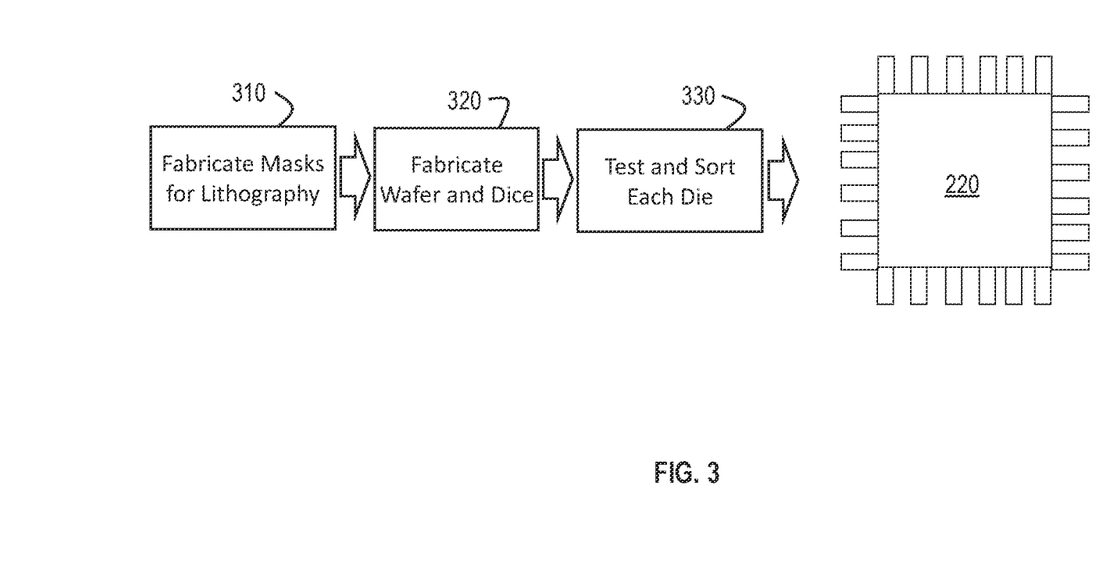
FIG. 3 is a process flow of a method of fabricating an integrated circuit in accordance with one or more embodiments of the present invention.

FIG. 3 is a process flow of a method of fabricating an integrated circuit (e.g., the IC 220 of FIG. 2) according to exemplary embodiments of the invention. Once the physical design data is obtained, based, in part, on effective metal density screens, the integrated circuit 220 can be fabricated according to known processes that are generally described with reference to FIG. 3. Generally, a wafer with multiple copies of the final design is fabricated and cut (i.e., diced) such that each die is one copy of the integrated circuit 220. At block 310, the processes include fabricating masks for lithography based on the finalized physical layout. At block 320, fabricating the wafer includes using the masks to perform photolithography and etching. Once the wafer is diced, testing and sorting each die is performed, at block 330, to filter out any faulty die.

Figures 4A, 4B:
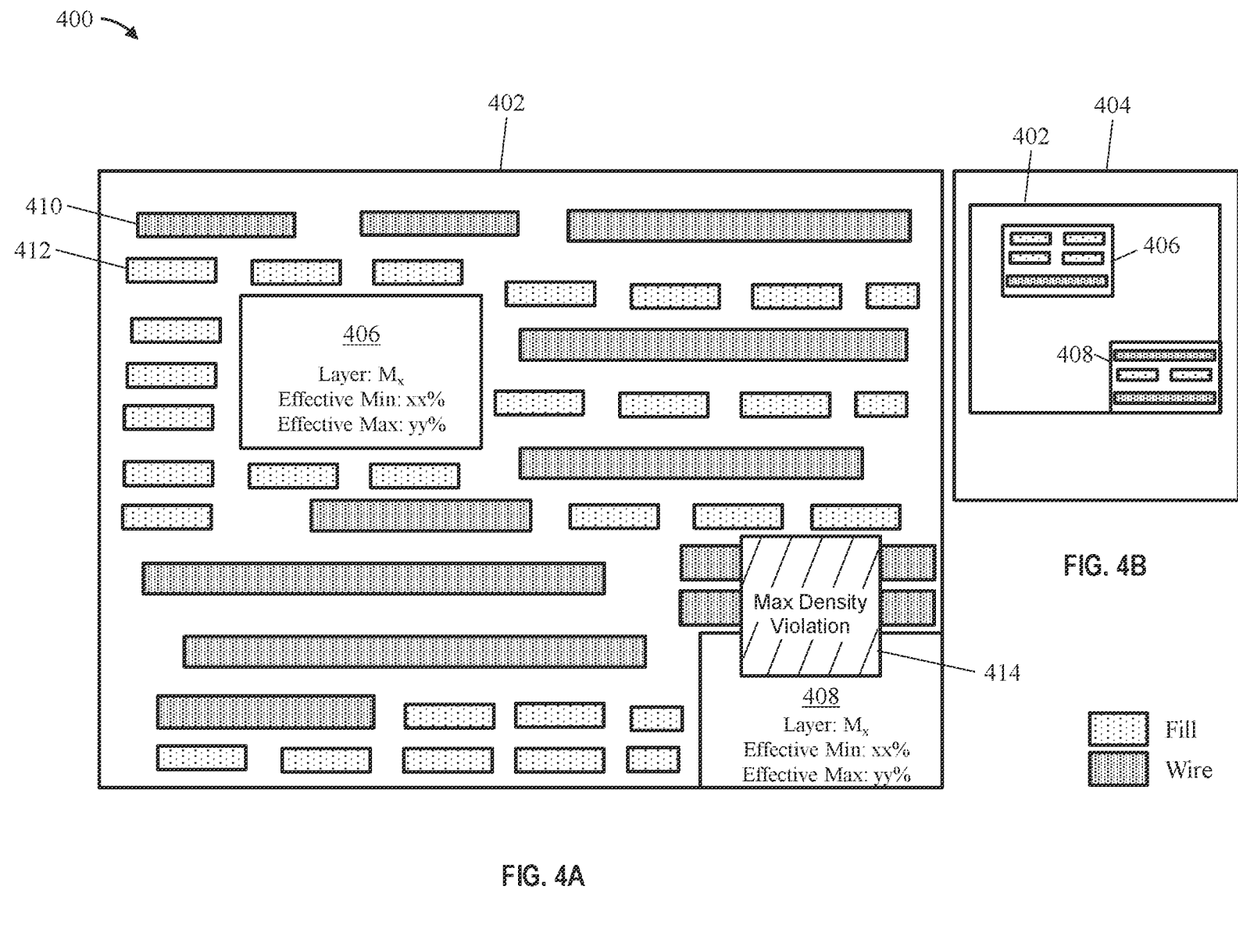
FIG. 4A illustrates an example hierarchical circuit design using effective metal density screens for hierarchical DRC analysis from the perspective of a child cell in accordance with one or more embodiments of the present invention.
FIG. 4B illustrates the example hierarchical circuit design of FIG. 4A from the perspective of a parent cell in accordance with one or more embodiments of the present invention.

FIGS. 4A and 4B depict a hierarchical circuit design 400 using effective metal density screens in accordance with one or more embodiments of the present invention. The portion of the hierarchical circuit design 400 shown in FIG. 4A is from the perspective of a child cell 402. The portion of the hierarchical circuit design 400 shown in FIG. 4B is from the perspective of a parent cell 404 of the child cell 402.

In some embodiments of the invention, the child cell 402 includes a cutout 406 and a notch 408, each belonging to the parent cell 404. While the child cell 402 is shown having a particular set of cutouts and notches (i.e., the cutout 406 and the notch 408) for ease of discussion and illustration, it should be understood that the structure of the child cell 402 is not meant to be particularly limited. For example, the child cell 402 can include any number of cutouts, notches, and internal shapes (wires, fill shapes, etc.) arbitrarily arranged as needed for the given application. Similarly, the parent cell 404 is shown in a simplified form for ease of illustration and details only the cutout 406 and the notch 408. Other configurations (number and arrangement of internal shapes, etc.) are possible and are within the contemplated scope of the disclosure. In some embodiments of the invention, the hierarchical circuit design 400 is a portion of a complete hierarchical circuit design (not separately shown).

As shown in FIGS. 4A and 4B, the hierarchical circuit design 400 includes a plurality of wires 410 and fill shapes 412 (also referred to as metal fill) arranged throughout the child cell 402 and the parent cell 404. The wires 410 and fill shapes 412 can be arranged as desired for a particular circuit design. In some embodiments of the invention, the wires 410 are placed as needed to provide the necessary electrical continuity between the various components of the hierarchical circuit design 400. In some embodiments of the invention, the fill shapes 412 are placed within each level (i.e., within the child cell 402 and/or the parent cell 404) among the wires 410 as needed to satisfy density rules for the respective level.

As discussed previously, during DRC the cutout 406, the notch 408, the perimeter outside of the child cell 402, and any blackboxed internal child hierarchies (not separately shown) appear empty from the perspective of the child cell 402 (see FIG. 4A). Consequently, during review of the child cell 402 conventional DRC analysis schemes can identify a number of false minimum density fails, such as around the cutout 406 and/or the notch 408. As shown in FIG. 4B, however, the cutout 406 and the notch 408 are not actually empty; instead, the various wires 410 and fill shapes 412 detailed in the parent cell 404 can be sufficient to satisfy the minimum density requirements within the child cell 402.

In some embodiments of the invention, the cutout 406 and the notch 408 (and any other internal or external shapes having unknown compositions from the perspective of the child cell 402) are defined within the DRC scheme as non-manufacturable blockage shapes. In some embodiments of the invention, each blockage shape is assigned a three-entry tuple that represents an expected range of densities for the respective region. The tuple can include, for example: (1) an identifier for the metal layer of the respective cell (e.g., "Mx"); (2) the minimum expected density for the identified metal layer (e.g., 28%, 33%, etc. for Mx); and (3) the maximum expected density for the identified metal layer (e.g., 86%, 95%, etc. for Mx).

In some embodiments of the invention, the assigned values for the minimum expected density and the maximum expected density of a particular blockage shape are defined by the DRC deck minimum and maximum density requirements. In other words, the minimum expected density and the maximum expected density can be standardized according to the respective DRC deck requirements employed for density checking. For example, if the DRC deck requires a minimum density of 13%, the minimum expected density for all blockage shapes can be set to 13%. Similarly, if the DRC deck requires a maximum density of 93%, the maximum expected density for all blockage shapes can be set to 93%.

In other embodiments, unique minimum expected density and maximum expected density values are assigned to each blockage shape based on the type of the particular cell/region. For example, standard logic cells can be assigned a minimum expected density of 11% (or 23%, 44%, etc.) and a maximum expected density of 67% (or 71%, 88%, etc.). Continuous from the previous example, memory array cells can be assigned a minimum expected density of 6% (or 13%, 30%, etc.) and a maximum expected density of 47% (or 62%, 98%, etc.).

In some embodiments of the invention, a combination of predetermined/standardized and unique density values can be assigned to the various blockage shapes. For example, a first cell type can be assigned standardized minimum and maximum densities while a second cell type can be assigned unique values according to the respective block type.

In some embodiments of the invention, the various minimum/maximum density ranges assigned to the blockage shapes within the child cell 402 are used to help predict density violations. In some embodiments of the invention, so-called edge cases can be applied to the blockage shapes to efficiently search for these density violations. For example, when running DRC checks for minimum density violations, the maximum expected density value for a blockage shape can be used. If the blockage shape at maximum density does not resolve a minimum density fail, then this indicates that a hierarchical density violation would not be fixable at the parent level of hierarchy, and the configuration of the various shapes (size, location, number, etc.) of the current level of hierarchy can be adjusted to increase metal density. Similarly, when running DRC checks for maximum density violations, the minimum expected density value for a blockage shape can be used. If the blockage shape at even minimum density does not resolve a maximum density fail, then the configuration of the various shapes (size, location, number, etc.) of the current level of hierarchy can be adjusted to decrease metal density. Advantageously, these types of edge-case density corrections can be completed within the current level of the hierarchy prior to running (or re-running, etc.) the DRC check for any other levels of the hierarchy (i.e., respective parent or child levels) for example by using the minimum predicted density for minimum density checks or by using the maximum predicted density for maximum density checks.

An example density violation is shown in FIG. 4A. In particular, a maximum density violation 414 is shown partially overlapping the notch 408 of the child cell 402. The maximum density violation 414 can result, for example, by applying the minimum expected density value for the notch 408 (e.g., 22%, etc.) and determining that, even at the minimum expected density, the DRC scheme signals a maximum density violation for the noted region. In some embodiments of the invention, the arrangement, configuration, size, shape, etc. of the various shapes within the child block 402 can be altered to satisfy the density violation. For example, one or more of the wires 410 and/or the fill shapes 412 can be moved, resized, deleted, added, etc. as needed.

Figure 5:
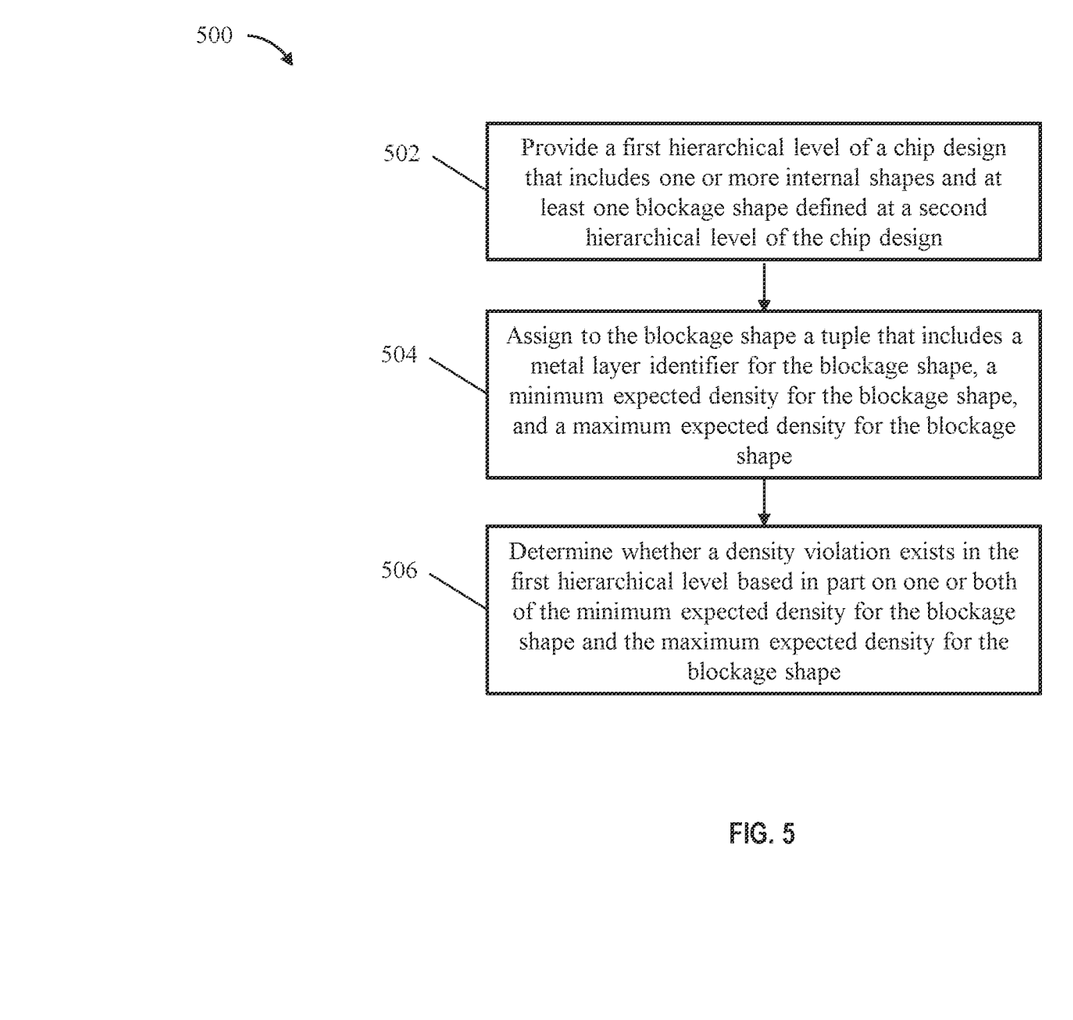
FIG. 5 is a flowchart in accordance with one or more embodiments of the present invention.

Referring now to FIG. 5, a flowchart 500 for performing a hierarchical DRC analysis using effective cross-hierarchy metal density screens is generally shown according to an embodiment. The flowchart 500 is described in reference to FIGS. 1-4 and may include additional blocks not depicted in FIG. 5. Although depicted in a particular order, the blocks depicted in FIG. 5 can be rearranged, subdivided, and/or combined. In accordance with one or more embodiments of the present invention, the computer system 100 of FIG. 1 is utilized to perform at least a portion of the processing described with reference to FIG. 5.

At block 502, a first hierarchical level of a chip design is provided. In some embodiments of the invention, the first hierarchical level is defined, generated, or otherwise constructed from a processing system (upstream or alongside the present operations). For example, the first hierarchical level can be defined within a predetermined (previously generated) layout file. In some embodiments of the invention, the first hierarchical level includes one or more internal shapes and at least one blockage shape having an internal structure defined at a second hierarchical level of the chip design. In some embodiments of the invention, the first hierarchal level comprises a child level of the chip design and the second hierarchical level comprises a parent level of the child level. In some embodiments of the invention, the first hierarchal level comprises a first child level of the chip design and the second hierarchical level comprises a second child level of the chip design. In some embodiments of the invention, the internal shapes comprise wire shapes and fill shapes.

At block 504, the blockage shape is assigned a tuple. In some embodiments of the invention, the tuple is a 3-tuple that includes a metal layer identifier for the blockage shape, a minimum expected density for the blockage shape, and a maximum expected density for the blockage shape. In some embodiments of the invention, the assigned values for the minimum expected density and the maximum expected density are defined by a design rule checking (DRC) deck minimum density requirement and a maximum density requirement, respectively.

At block 506, a check is made to determine whether a density violation exists in the first hierarchical level. In some embodiments of the invention, the check is based in part on one or both (at least one) of the minimum expected density for the blockage shape and the maximum expected density for the blockage shape. For example, when running DRC checks for minimum density violations, the maximum expected density value for a blockage shape can be used. Similarly, when running DRC checks for maximum density violations, the minimum expected density value for a blockage shape can be used.

The method can further include adjusting one or more of a size, a shape, and a position (or even existence) of an internal shape of the one or more internal shapes of the first hierarchical level in response to determining that the density violation exists. In some embodiments of the invention, the adjustment is made prior to completing a design rule check of the second hierarchical level.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
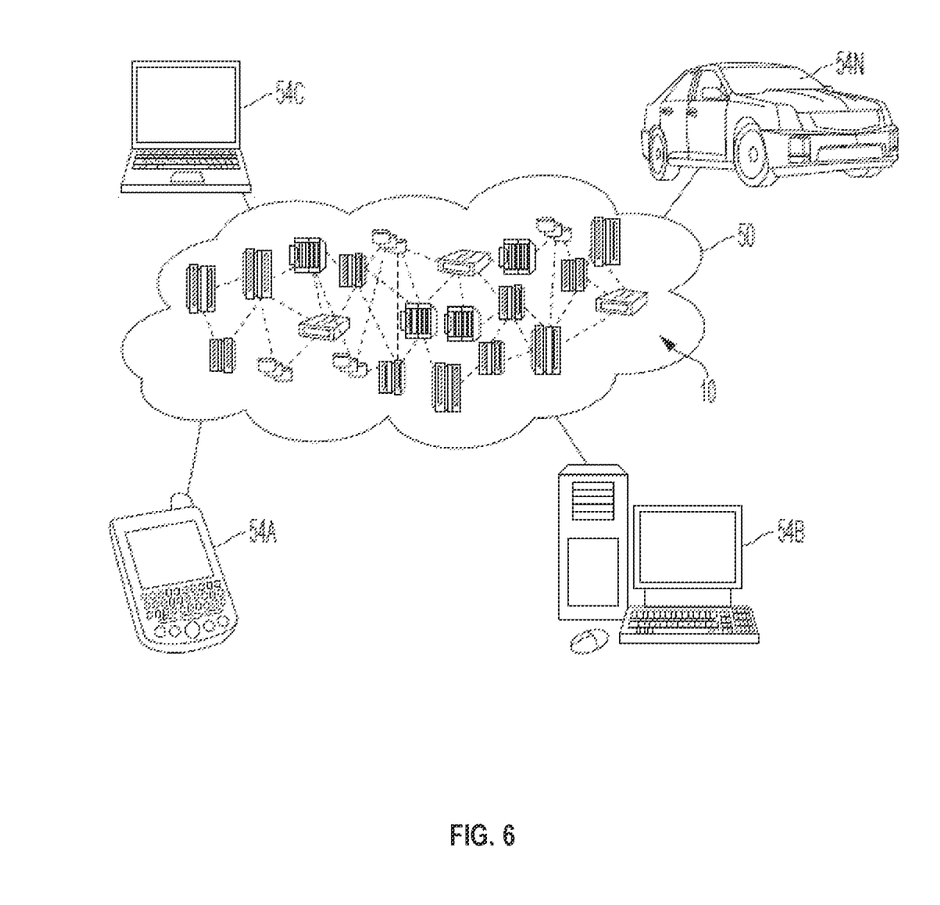
FIG. 6 depicts a cloud computing environment according to one or more embodiments of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
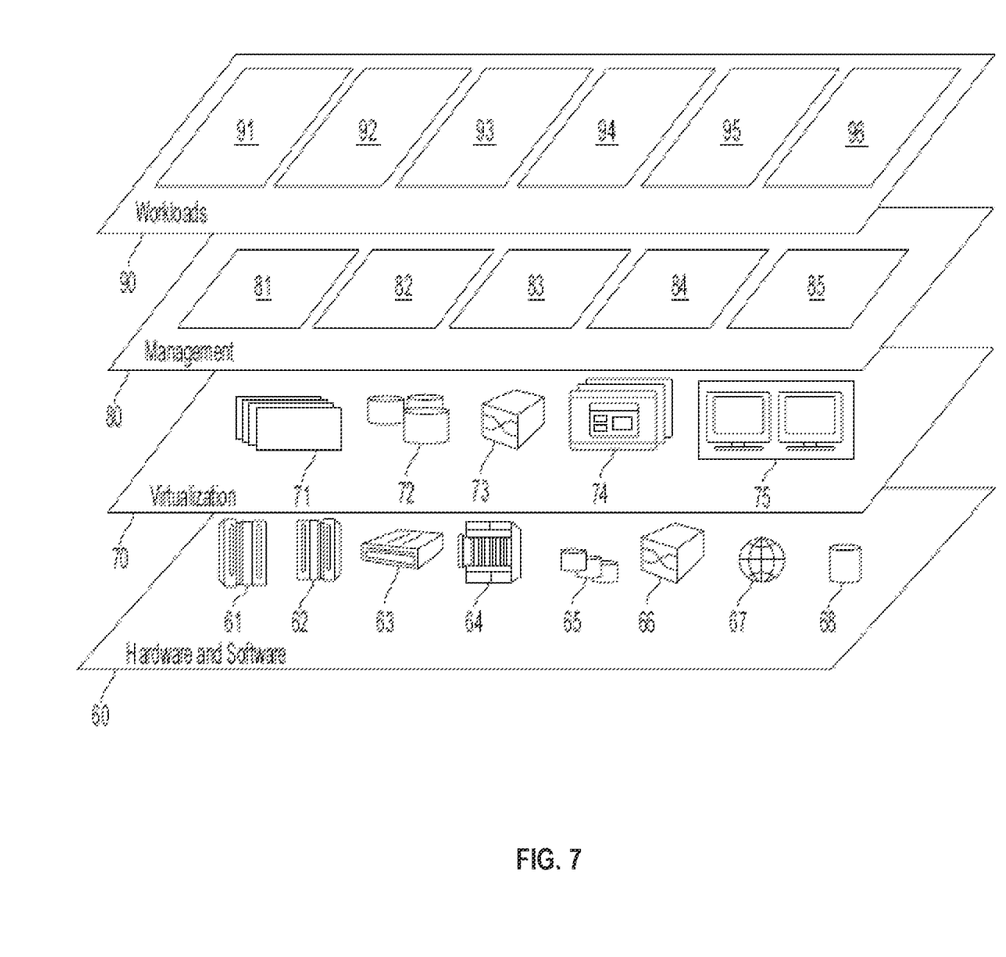
FIG. 7 depicts abstraction model layers according to one or more embodiments of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software applications 96 (e.g., software 111 of FIG. 1), etc. Also, software applications can function with and/or be integrated with Resource provisioning 81.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   providing a first hierarchical level of a chip design, the first hierarchical level comprising one or more internal shapes and at least one blockage shape having an internal structure defined at a second hierarchical level of the chip design, the internal structure unknown to the first hierarchical level;
   assigning, to the blockage shape, a tuple comprising a metal layer identifier for the blockage shape, a minimum expected density for the blockage shape, and a maximum expected density for the blockage shape; and
   determining whether a density violation exists in the first hierarchical level based in part on one or both of the minimum expected density for the blockage shape violating a maximum density limit for the chip design or the maximum expected density for the blockage shape violating a minimum density limit for the chip design, thereby detecting the density violation prior to executing a design rule check (DRC) for the second hierarchical level.

2. The computer-implemented method of claim 1 further comprising adjusting one or more of a size, a shape, and a position of an internal shape of the one or more internal shapes of the first hierarchical level in response to determining that the density violation exists.

3. The computer-implemented method of claim 2, wherein the adjustment is made prior to completing a design rule check of the second hierarchical level.

4. The computer-implemented method of claim 1, wherein the first hierarchal level comprises a child level of the chip design and the second hierarchical level comprises a parent level of the child level.

5. The computer-implemented method of claim 1, wherein the first hierarchal level comprises a first child level of the chip design and the second hierarchical level comprises a second child level of the chip design.

6. The computer-implemented method of claim 1, wherein the internal shapes comprise wire shapes and fill shapes.

7. The computer-implemented method of claim 1, wherein the assigned values for the minimum expected density and the maximum expected density are defined by a design rule checking (DRC) deck minimum density requirement and a maximum density requirement, respectively.

8. A system comprising a memory having computer readable instructions and one or more processors for executing the computer readable instructions, the computer readable instructions controlling the one or more processors to perform operations comprising:
   providing a first hierarchical level of a chip design, the first hierarchical level comprising one or more internal shapes and at least one blockage shape having an internal structure defined at a second hierarchical level of the chip design, the internal structure unknown to the first hierarchical level;
   assigning, to the blockage shape, a tuple comprising a metal layer identifier for the blockage shape, a minimum expected density for the blockage shape, and a maximum expected density for the blockage shape; and
   determining whether a density violation exists in the first hierarchical level based in part on one or both of the minimum expected density for the blockage shape violating a maximum density limit for the chip design or the maximum expected density for the blockage shape violating a minimum density limit for the chip design, thereby detecting the density violation prior to executing a design rule check (DRC) for the second hierarchical.

9. The system of claim 8 further comprising adjusting one or more of a size, a shape, and a position of an internal shape of the one or more internal shapes of the first hierarchical level in response to determining that the density violation exists.

10. The system of claim 9, wherein the adjustment is made prior to completing a design rule check of the second hierarchical level.

11. The system of claim 8, wherein the first hierarchal level comprises a child level of the chip design and the second hierarchical level comprises a parent level of the child level.

12. The system of claim 8, wherein the first hierarchal level comprises a first child level of the chip design and the second hierarchical level comprises a second child level of the chip design.

13. The system of claim 8, wherein the internal shapes comprise wire shapes and fill shapes.

14. The system of claim 8, wherein the assigned values for the minimum expected density and the maximum expected density are defined by a design rule checking (DRC) deck minimum density requirement and a maximum density requirement, respectively.

15. A computer program product comprising a computer readable storage medium having program instructions embodied therewith, the program instructions executable by one or more processors to cause the one or more processors to perform operations comprising:
providing a first hierarchical level of a chip design, the first hierarchical level comprising one or more internal shapes and at least one blockage shape having an internal structure defined at a second hierarchical level of the chip design, the internal structure unknown to the first hierarchical level;
assigning, to the blockage shape, a tuple comprising a metal layer identifier for the blockage shape, a minimum expected density for the blockage shape, and a maximum expected density for the blockage shape; and
determining whether a density violation exists in the first hierarchical level based in part on one or both of the minimum expected density for the blockage shape violating a maximum density limit for the chip design or the maximum expected density for the blockage shape violating a minimum density limit for the chip design, thereby detecting the density violation prior to executing a design rule check (DRC) for the second hierarchical.

16. The computer program product of claim 15 further comprising adjusting one or more of a size, a shape, and a position of an internal shape of the one or more internal shapes of the first hierarchical level in response to determining that the density violation exists.

17. The computer program product of claim 16, wherein the adjustment is made prior to completing a design rule check of the second hierarchical level.

18. The computer program product of claim 15, wherein the first hierarchal level comprises a child level of the chip design and the second hierarchical level comprises a parent level of the child level.

19. The computer program product of claim 15, wherein the first hierarchal level comprises a first child level of the chip design and the second hierarchical level comprises a second child level of the chip design.

20. The computer program product of claim 15, wherein the internal shapes comprise wire shapes and fill shapes.

* * * * *